(12) United States Patent
Serizawa et al.

(10) Patent No.: US 10,663,270 B2
(45) Date of Patent: May 26, 2020

(54) THREADED MEMBER, FASTENING MEMBER, AND DART

(71) Applicant: Jinta Serizawa, Tokyo (JP)

(72) Inventors: Jinta Serizawa, Tokyo (JP); Yoshitaro Tejima, Kashiwa (JP)

(73) Assignee: Jinta Serizawa, Tokyo (JP)

( * ) Notice: Subject to any disclaimer, the term of this patent is extended or adjusted under 35 U.S.C. 154(b) by 0 days.

(21) Appl. No.: 16/081,304

(22) PCT Filed: Feb. 9, 2017

(86) PCT No.: PCT/JP2017/004804
§ 371 (c)(1),
(2) Date: Aug. 30, 2018

(87) PCT Pub. No.: WO2017/150131
PCT Pub. Date: Sep. 8, 2017

(65) Prior Publication Data
US 2019/0025027 A1    Jan. 24, 2019

(30) Foreign Application Priority Data

Mar. 2, 2016   (JP) ................. 2016-040439

(51) Int. Cl.
*F42B 6/00* (2006.01)
*F16B 39/30* (2006.01)
*A63B 65/02* (2006.01)

(52) U.S. Cl.
CPC .............. *F42B 6/003* (2013.01); *A63B 65/02* (2013.01); *F16B 39/30* (2013.01)

(58) Field of Classification Search
CPC .......... F42B 6/003; F16B 39/30; F16B 39/36; A63B 65/02
(Continued)

(56) References Cited

U.S. PATENT DOCUMENTS

| 5,110,245 A | 5/1992 | Hiroyuki |
| 2004/0081535 A1 | 4/2004 | Birkelbach et al. |

(Continued)

FOREIGN PATENT DOCUMENTS

| CN | 1487208 A | 4/2004 |
| CN | 101855463 A | 10/2010 |

(Continued)

OTHER PUBLICATIONS

International Search Report for PCT/JP2017/004804, dated Apr. 4, 2017, 4 pages.

(Continued)

*Primary Examiner* — John E Simms, Jr.
*Assistant Examiner* — Rayshun K Peng
(74) *Attorney, Agent, or Firm* — Nixon & Vanderhye P.C.

(57) ABSTRACT

A threaded member has a discontinuous helical thread ridge 15 on which a plurality of dividing portions 14 are formed in the middle. At least one of the discontinuous portions of the thread ridge 15, which is interposed between the dividing portions 14, is a locking portion 18 which is configured such that a flank angle of one flank, out of flanks on both sides of the thread ridge 15, is smaller than a flank angle of a flank corresponding to a basic ridge profile and at least part of the flank is disposed on an outside of the flank corresponding to the basic ridge profile.

5 Claims, 6 Drawing Sheets

(58) Field of Classification Search
USPC .......................................................... 473/582
See application file for complete search history.

(56) References Cited

U.S. PATENT DOCUMENTS

| | | | |
|---|---|---|---|
| 2008/0050200 A1 | 2/2008 | Su | |
| 2008/0080953 A1 | 4/2008 | Wu | |
| 2009/0274535 A1 | 11/2009 | Mair | |
| 2011/0235193 A1* | 9/2011 | Yagi | G02B 7/04 |
| | | | 359/819 |
| 2011/0262245 A1* | 10/2011 | Michiwaki | F16B 33/006 |
| | | | 411/412 |
| 2013/0230364 A1* | 9/2013 | Mori | F16B 39/282 |
| | | | 411/166 |

FOREIGN PATENT DOCUMENTS

| | | |
|---|---|---|
| CN | 103069179 A | 4/2013 |
| DE | 10 2014 213 610 A1 | 1/2016 |
| JP | 58-028008 | 2/1983 |
| JP | A-58-099513 | 7/1983 |
| JP | 08-177839 | 7/1996 |
| JP | 3031085 | 11/1996 |
| JP | 2002-089758 | 3/2002 |
| JP | 2003-042130 | 2/2003 |
| JP | 2003-113827 | 4/2003 |
| JP | 2007-289217 | 11/2007 |
| JP | 2007289217 A * | 11/2007 |
| JP | 2010-046256 | 3/2010 |
| JP | 2011-110413 | 6/2011 |
| JP | 2013-521441 | 6/2013 |
| JP | 2014-194282 | 10/2014 |
| WO | WO 2007/000983 A1 | 1/2007 |
| WO | 2010/092817 | 8/2010 |
| WO | 2011/106596 | 9/2011 |

OTHER PUBLICATIONS

Notice of Allowance for JP2016-040439, dated Jun. 28, 2016, 6 pages.
Extended European Search Report dated Aug. 8, 2019 in European Application No. 17759602.0, 8 pages.
Chinese Office Action dated Oct. 21, 2019 in Chinese Application No. 201780014417.5, with English translation of Search Report, 8 pages.

* cited by examiner

THREADED MEMBER, FASTENING MEMBER, AND DART

TECHNICAL FIELD

The present invention relates to a threaded member, and a fastening member and a dart, both of which include the threaded member.

This application is the U.S. national phase of International Application No. PCT/JP2017/004804 filed Feb. 9, 21017, which designated the U.S. and claims priority to Japanese Patent Application No. 2016-40439, filed on Mar. 2, 2016, the entire contents of each of which are hereby incorporated herein by reference.

BACKGROUND ART

A dart (throwing arrow) used in a dart game is configured with a metal barrel which is a portion held by a player with fingers, a point (tip) attached to a front end side of the barrel, a shaft attached to a rear end side of the barrel, and a flight (arrow feathers) attached to the shaft. The dart includes a hard dart having a metal point and a soft dart having a plastic point. Many shafts and flights are plastic.

A plastic point, a plastic shaft, and a plastic flight are likely to be damaged by a shock occurred when stuck into a dartboard or when falling to the floor. For this reason, many darts can be easily disassembled into a point, a barrel, a shaft, and a flight, and are made such that the point, the shaft, and the flight can be replaced. In general, the point and the barrel, and the barrel and the shaft are detachably fastened to each other by respectively provided threaded portions.

However, there is a problem in which fastening by the threaded portions is likely to be loosened while the throwing of the dart is repeated. In the case of a dart, the width of a thread ridge of a barrel slightly differs according to a manufacturer. For this reason, a thread ridge of a point or a shaft is designed to fit barrels of various manufacturers such that there is a clearance to a large extent with respect to the basic ridge profile. In this case, it is particularly likely to be loosened. If fastening by the threaded portions is loosened, a player is bothered by the loosening during the game and the player lose concentration in some cases.

The following is proposed as a dart in which fastening by a threaded portion is unlikely to be loosened.

(1) A dart including, in a threaded hole, a biasing member for pushing a threaded shank, which is a shaft screwed in the threaded hole of a barrel, back in a direction of separating away from the threaded hole (PTL 1).

(2) A dart in which a projection pushing a barrel back in a direction of separating away from a thread by elastic deformation is provided on a bearing surface of a point and a shaft, both of which has a threaded shank screwed into a threaded hole of the barrel (PTL 2).

In both darts of (1) and (2), by one member pushing the other member back in the direction of separating away from a thread, a large frictional force is generated between a thread ridge of the threaded shank and a thread ridge of the threaded hole. Consequently, fastening by the threaded portion is prevented from being loosened.

However, in the dart of (1), it is necessary to provide the biasing member in the threaded hole, and thus manufacturing costs of the dart increase. In the dart of (2), even if locking effects arise in a state where the barrel presses against the projection, the locking effects are lost when the barrel is even slightly separated away from the projection.

For example, although not related to a dart, the following is proposed as a fastening member in which fastening by a threaded portion is unlikely to be loosened.

(3) A fastening member which is configured such that a flank angle of one flank, out of flanks on both sides of a thread ridge of one threaded member, is smaller than a flank angle of a flank of a thread ridge of the other threaded member (basic ridge profile) (PTLS 3 and 4).

(4) A fastening member which is configured such that a slit is formed in a crest of a thread ridge of one threaded member and flank angles of both sides of a thread ridge of one threaded member are smaller than a flank angle of a flank of a thread ridge of the other threaded member (basic ridge profile) (PTLS 5 and 6).

In both fastening members of (3) and (4), the thread ridge of one threaded member abuts the thread ridge of the other threaded member when fastening one threaded member and the other threaded member together, and a large frictional force is generated between one threaded member and the other threaded member by elastic deformation. Consequently, fastening by the threaded portion is prevented from being loosened.

CITATION LIST

Patent Literature

[PTL 1] Japanese Unexamined Patent Application, First Publication No. 2007-289217

[PTL 2] Japanese Unexamined Patent Application, First Publication No. 2011-110413

[PTL 3] Japanese Unexamined Patent Application, First Publication No. H8-177839

[PTL 4] PCT International Publication No. WO2010/092817

[PTL 5] Japanese Unexamined Patent Application, First Publication No. S58-28008

[PTL 6] Japanese Unexamined Patent Application, First Publication No. 2003-42130

SUMMARY OF INVENTION

Technical Problem

However, in both fastening members of (3) and (4), a large force is necessary to elastically deform the entire thread ridge since the thread ridge is helically continuous. For this reason, there is a problem in which large torque is necessary at the time of fastening and fastening the threaded members together is difficult.

The invention provides a threaded member that has locking effects, does not require a large force when being fastened to another threaded member, or can adjust a force generated at the time of fastening (frictional force) by design, and a fastening member and a dart that make fastening by a threaded portion unlikely to be loosened, does not require a large force when fastening the members together, or can adjust a force generated at the time of fastening (frictional force) by design.

Solution to Problem

The invention has the following aspects.

<1> A threaded member including a discontinuous helical thread ridge on which a plurality of dividing portions are formed in the middle, in which at least one of discontinuous portions of the thread ridge interposed between the dividing portions is a locking portion which is configured such that a flank angle of one flank, out of flanks on both sides of the thread ridge, is smaller than a flank angle of a flank corresponding to a basic ridge profile and at least a part of the one flank is disposed on an outside of the flank corresponding to the basic ridge profile.

<2> The threaded member according to <1>, in which the locking portion is configured such that the other flank is disposed on an inside of the flank corresponding to the basic ridge profile so as to form a gap on the whole between the other flank, out of the flanks on both sides of the thread ridge, and the flank corresponding to the basic ridge profile.

<3> The threaded member according to <1> or <2>, in which at least one of the discontinuous portions is a first locking portion which is configured such that a flank angle of a trailing flank is smaller than a flank angle of a trailing flank of the basic ridge profile and at least part of the trailing flank is disposed on an outside of the trailing flank of the basic ridge profile, and at least one of the discontinuous portions is a second locking portion which is configured such that a flank angle of a leading flank is smaller than a flank angle of a leading flank of the basic ridge profile and at least part of the leading flank is disposed on an outside of the leading flank of the basic ridge profile.

<4> The threaded member according to any one of <1> to <3>, in which inclined portions that form a ridge of which a height becomes lower as becoming closer to ends thereof are provided on both ends of the locking portion in a helical direction.

<5> A fastening member including a male threaded member and a female threaded member that is detachably fastened to the male threaded member, in which one or both of the male threaded member and the female threaded member is the threaded member according to any one of <1> to <4>.

<6> A dart including a barrel, a point fastened to a first end portion of the barrel, a shaft fastened to a second end portion of the barrel, and a flight attached to the shaft, in which at least one of the point, the barrel, and the shaft is the threaded member according to any one of <1> to <4>.

Advantageous Effects of Invention

The threaded member of the invention has locking effects, does not require a large force when being fastened to another threaded member or can adjust a force generated at the time of fastening (frictional force) by design.

The fastening member and the dart of the invention make fastening by the threaded portion unlikely to be loosened, do not require a large force when fastening the members together, or can adjust a force generated at the time of fastening (frictional force) by design.

DESCRIPTION OF EMBODIMENTS

Figure 1:
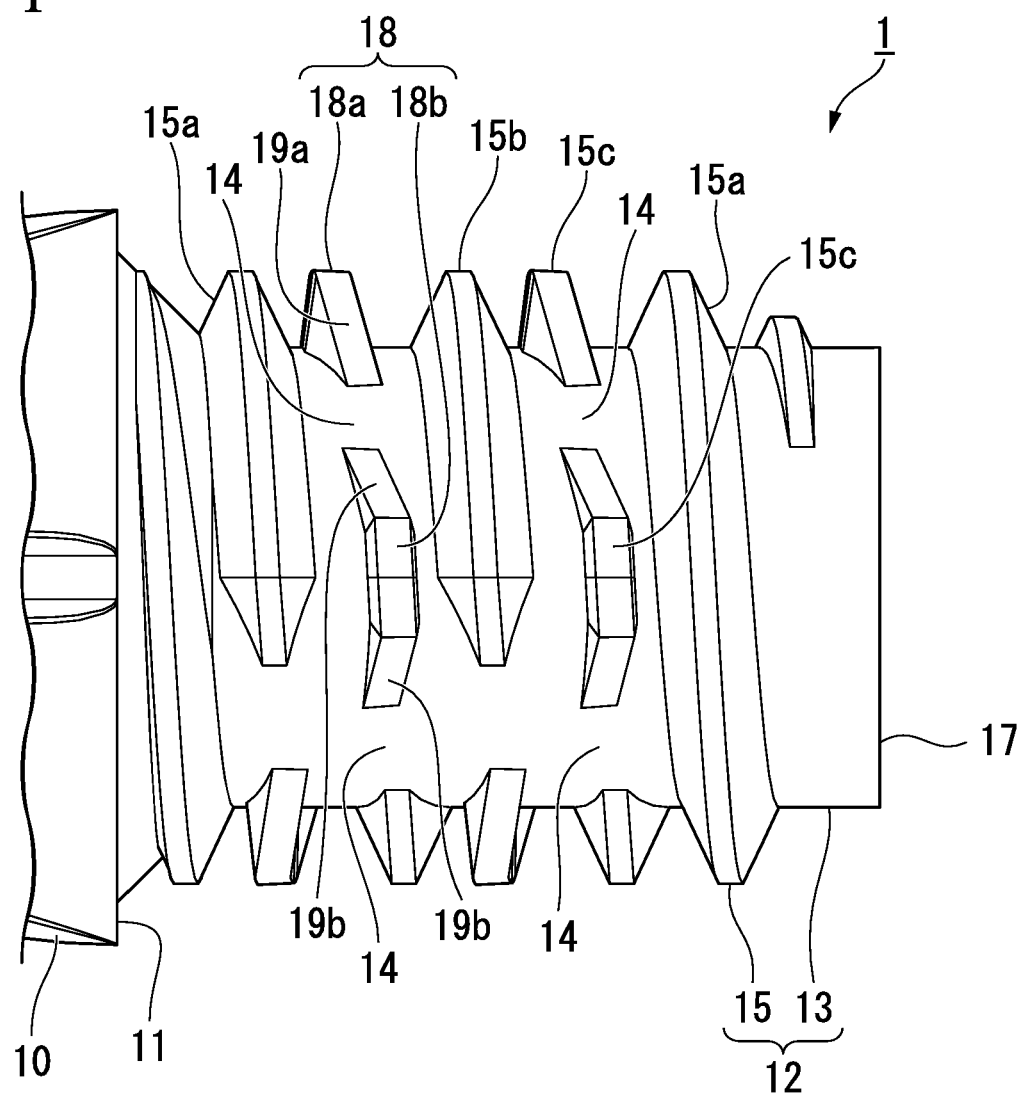
FIG. 1 is a side view illustrating the vicinity of a threaded portion according to an embodiment of a threaded member of the invention.

The following definitions of terms can be applied to the specification and claims.

The term "threaded member" refers to a component having threads on part thereof. A threaded member having male threads is referred to as a male threaded member, and a threaded member having female threads is referred to as a female threaded member.

The term "threaded portion" refers to a portion (threaded shank) of male threads or a portion (threaded hole) of female threads on the threaded member.

The term "male thread" refers to a thread, which is a thread ridge is on a cylindrical or conical external surface.

The term "female thread" refers to a thread, which is a thread ridge is on a cylindrical or conical internal surface.

The term "thread ridge" refers to a physical portion between two adjacent flanks.

The term "thread groove" refers to a space portion which is a trough between two adjacent flanks.

The term "flank" refers to a surface connecting a crest of a thread ridge to a root of a thread groove.

The term "flank angle" refers to an angle between an individual flank and a straight line perpendicular to an axis, which is measured in a section including the axis of a thread.

The term "thread ridge angle" refers to an angle between two adjacent flanks, which is measured in the section including the axis of the thread.

The term "leading flank" refers to a flank facing a moving direction of the threaded member when being screwed in.

The term "trailing flank" refers to a flank on a side opposite to the leading flank.

The term "pressured flank" refers to a flank that directly receives a load when the load is applied by screwing in.

The term "clearance flank" refers to a flank on a side opposite to the pressured flank.

The term "crest" refers to a surface connecting flanks on both sides of a thread ridge.

The term "root" refers to a surface connecting flanks on both sides of a thread groove.

The term "bearing surface" refers to a portion of a surface receiving a direct force when the threaded member is tightened. However, flanks of a thread are excluded.

The term "basic ridge profile" refers to a theoretical thread ridge shape of a thread defined by a theoretical dimension and a theoretical angle common to a female thread and a male thread, in the section including the axis. For example, the basic ridge profile for general purpose metric screw threads is specified in Japanese Industrial Standards, that is, JIS B 0205-1: 2001 (equivalent international standards ISO 68-1: 1998), and is a thread ridge shape having a thread ridge angle of 60° and a flank angle of 30°. The basic ridge profile for metric trapezoidal screw threads is specified in Japanese Industrial Standards, that is, JIS B 0216-1: 2013 (equivalent international standards ISO 2901: 1993) and is a thread ridge shape having a thread ridge angle of 30° and a flank angle of 15°. The basic ridge profile for parallel pipe threads is specified in Japanese Industrial Standards, that is, JIS B 0202: 1999 (equivalent international standards ISO 228-1: 1994) and is a thread ridge shape having a thread ridge angle of 55° and a flank angle of 27.5°.

The definitions of the terms related to the thread conform to Japanese Industrial Standards, that is, JIS B 0101: 2013 "thread terms" (equivalent international standards ISO 1891: 2009 and ISO 5408: 2009).

<Threaded Member>

A threaded member of the invention has a discontinuous helical thread ridge on which a plurality of dividing portions are formed in the middle.

In the threaded member of the invention, at least one of discontinuous portions of each of the thread ridges, which is interposed between the dividing portions, is set as a locking portion.

In the locking portion, a flank angle of at least one flank, out of flanks on both sides of a thread ridge, is smaller than a flank angle of a flank corresponding to the basic ridge profile. At least part of the flank having a flank angle smaller than the flank angle of the flank corresponding to the basic ridge profile is disposed on the outside of the flank corresponding to the basic ridge profile.

Hereinafter, a case where the threaded member of the invention is a plastic male threaded member will be described as an example with reference to the drawings.

One Embodiment

Figure 2:
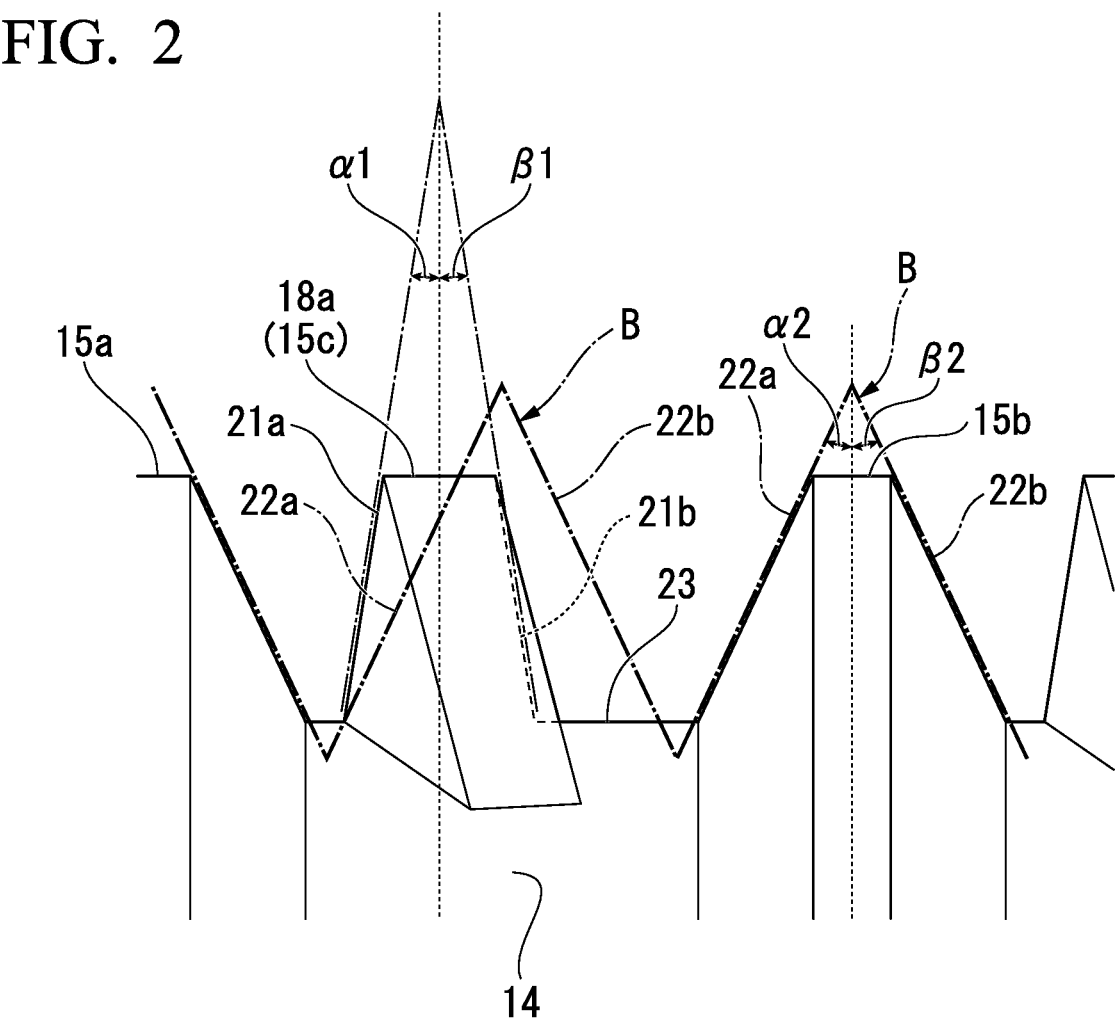
FIG. 2 is an enlarged view in which the vicinity of a thread ridge of FIG. 1 is enlarged.

FIG. 1 is a side view illustrating the vicinity of a threaded portion (threaded shank) according to an embodiment of a threaded member (male threaded member) of the invention. FIG. 2 is an enlarged view in which the vicinity of the thread ridge of FIG. 1 is enlarged.

A male threaded member 1 has a member main body 10 and a threaded shank 12 jutting out from a bearing surface 11 of the member main body 10.

The threaded shank 12 has a cylinder 13 and a discontinuous helical thread ridge 15, on which a plurality of dividing portions 14 are formed in the middle, on an outer circumference of the cylinder 13.

The thread ridge 15 has continuous portions 15a, which extend from a bearing surface 11 side or a thread end 17 side to a portion divided by the first dividing portion 14, a relatively long discontinuous portion 15b, which is in the vicinity of the middle of the threaded shank 12 and is interposed between the dividing portions 14, and a plurality of relatively short discontinuous portions 15c, each of which is in between the continuous portion 15a and the long discontinuous portion 15b and is interposed between the dividing portions 14. Out of these portions, the short discontinuous portions 15c are set as locking portions 18.

Some of the plurality of locking portions 18 are set as first locking portions 18a, and the rest of the locking portions are set as second locking portions 18b.

Each of the first locking portions 18a is set such that a flank angle $\alpha 1$ of a trailing flank 21a (pressured flank) is smaller than a flank angle $\alpha 2$ of a trailing flank 22a of a basic ridge profile B.

Each of the first locking portions 18a is set such that a flank angle $\beta 1$ of a leading flank 21b (clearance flank) is smaller than a flank angle $\beta 2$ of a leading flank 22b of the basic ridge profile B.

Each of the first locking portions 18a is configured such that the trailing flank 21a is disposed on the outside of the trailing flank 22a of the basic ridge profile B.

The width of each of the first locking portions 18a at the same height as that of a root 23 is smaller than the width of the basic ridge profile B such that the leading flank 21b is on the inside of the leading flank 22b of the basic ridge profile B.

As in the first locking portions 18a, each of the second locking portions 18b is set such that the flank angle $\alpha 1$ of the trailing flank 21a (pressured flank) is smaller than the flank angle $\alpha 2$ of the trailing flank 22a of the basic ridge profile B.

As in the first locking portions 18a, each of the second locking portions 18b is set such that the flank angle $\beta 1$ of the leading flank 21b (clearance flank) is smaller than the flank angle $\beta 2$ of the leading flank 22b of the basic ridge profile B.

Each of the second locking portions 18b is configured such that the leading flank 21b is disposed on the outside of the leading flank 22b of the basic ridge profile B, contrary to the first locking portions 18a.

The width of each of the second locking portions 18b at the same height as that of the root 23 is smaller than the width of the basic ridge profile B such that the trailing flank 21a is on the inside of the trailing flank 22a of the basic ridge profile B, contrary to the first locking portions 18a.

On both end portions of the first locking portions 18a in a helical direction, inclined portions 19a that are slightly bent on the thread end 17 side and form a ridge of which the height becomes lower as becoming closer to ends thereof are provided.

On both end portions of the second locking portions 18b in the helical direction, inclined portions 19b that are slightly bent on the bearing surface 11 side and form a ridge of which the height becomes lower as becoming closer to ends thereof are provided.

It is sufficient that the flank angle $\alpha 1$ of each of the first locking portions 18a is smaller than the flank angle $\alpha 2$ of the basic ridge profile B. It is preferable that the flank angle $\alpha 1$ be equal to or smaller than a half of the flank angle $\alpha 2$ in order to have sufficient locking effects.

It is sufficient that the flank angle $\beta 1$ of each of the second locking portions 18b is smaller than the flank angle $\beta 2$ of the basic ridge profile B. It is preferable that the flank angle $\beta 1$ be equal to or smaller than a half of the flank angle $\beta 2$ in order to have sufficient locking effects.

It is preferable that the width of each of the locking portions 18 at the same height as that of the root 23 be 30 to 60% of the width of the basic ridge profile B at the same height as that of the root 23 in consideration of a balance between maintenance of the strength of the locking portions 18 and easiness of elastic deformation.

Mechanism of Action

Reasons for the male threaded member 1 having locking effects are as follows.

Figure 3:
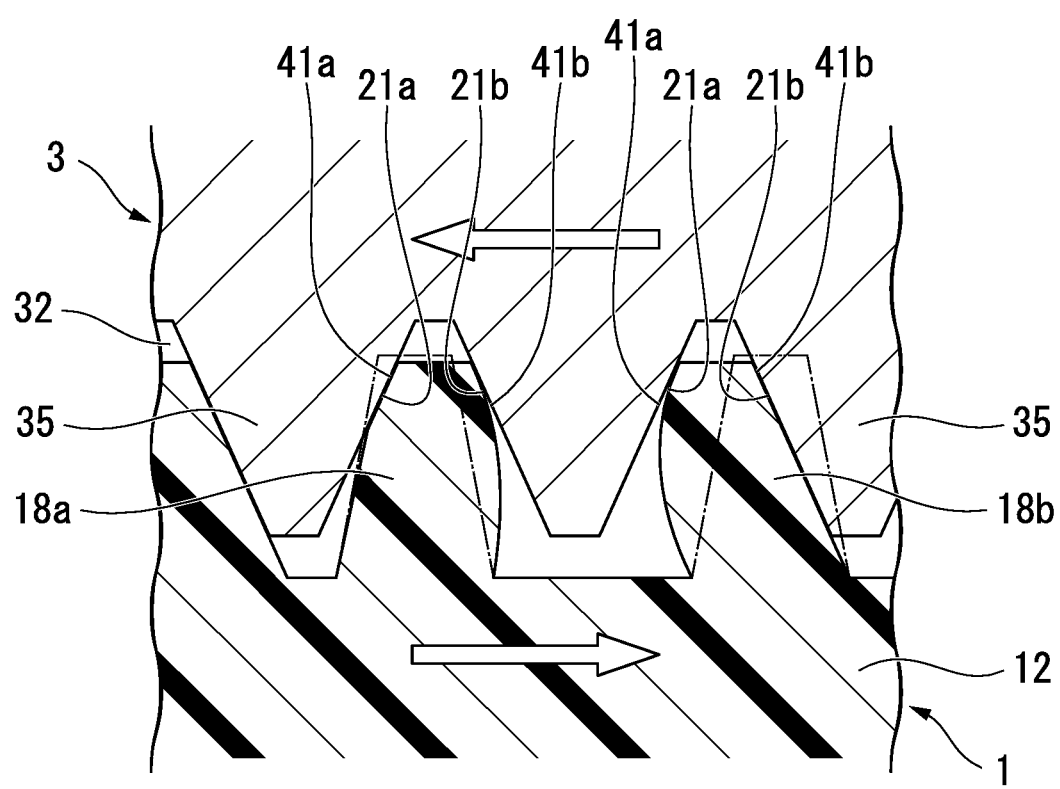
FIG. 3 is a sectional view illustrating a state of the thread ridge when screwing a threaded shank of a male threaded member, which is the embodiment of the threaded member of the invention, into a threaded hole of a female threaded member.

In each of the first locking portions 18a, $\alpha 1 < \alpha 2$ is satisfied and the trailing flank 21a is disposed on the outside of the trailing flank 22a of the basic ridge profile B. For this reason, as illustrated in FIG. 3, when screwing the threaded shank 12 of the male threaded member 1 into threaded holes 32 of a female threaded member 3, which is designed to have thread ridges 35 in accordance with the basic ridge profile, in an arrow direction, the trailing flanks 21a of the first locking portions 18a on a one-dot chain line abut against trailing flanks 41a of the thread ridges 35 of the female threaded member 3 and elastically deform before being screwed in. Since the elastically deformed first locking portions 18a push back the thread ridges 35 which have abutted the first locking portions, a large frictional force is generated between each first locking portion 18a and each thread ridge 35.

In each of the second locking portions 18b, β1<β2 is satisfied and the leading flank 21b is disposed on the outside of the leading flank 22b of the basic ridge profile B. For this reason, as illustrated in FIG. 3, when screwing the threaded shank 12 of the male threaded member 1 into the threaded holes 32 of the female threaded member 3, which is designed to have thread ridges 35 in accordance with the basic ridge profile, in the arrow direction, the leading flanks 21b of the second locking portions 18b on a one-dot chain line abut against leading flanks 41b of the thread ridges 35 of the female threaded member 3 and elastically deform before being screwed in. Since the elastically deformed second locking portions 18b push back the thread ridges 35 which have abutted the second locking portions, a large frictional force is generated between each second locking portion 18b and each thread ridge 35.

As described above, the locking portions 18 of the male threaded member 1 and the thread ridges 35 of the female threaded member 3 generate a large frictional force both between the trailing flanks and between the leading flanks. For this reason, even when screwing the threaded shank 12 of the male threaded member 1 into the threaded holes 32 of the female threaded member 3 is stopped in the middle, fastening between the threaded shank 12 and the threaded holes 32 can be sufficiently prevented from being loosened.

Figure 4:
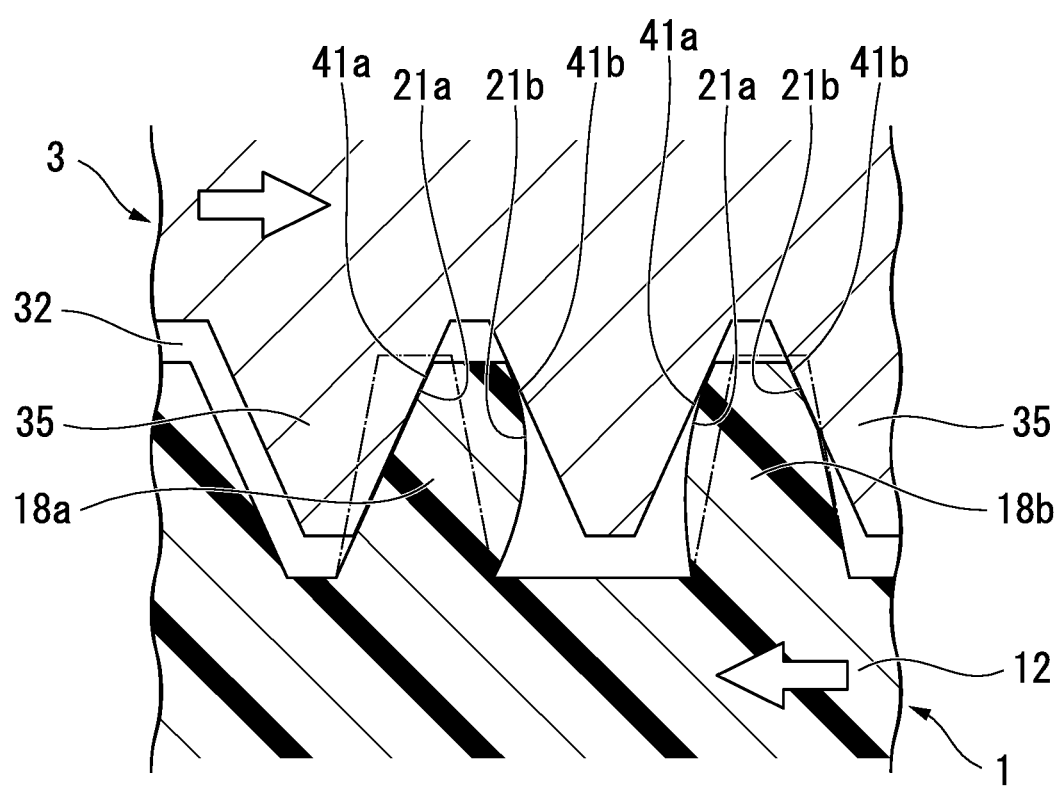
FIG. 4 is a sectional view illustrating a state of the thread ridge when the threaded shank of the male threaded member, which is the embodiment of the threaded member of the invention, is completely screwed in the threaded hole of the female threaded member and a load is applied from a bearing surface side.

As illustrated in FIG. 4, even when the threaded shank 12 of the male threaded member 1 is completely screwed in the threaded holes 32 of the female threaded member 3 and loads are applied from the bearing surface 11 side of the male threaded member 1 and a bearing surface side of the threaded holes 32 in arrow directions, the locking portions 18 of the male threaded member 1 and the thread ridges 35 of the female threaded member 3 generate a large frictional force both between the pressured flanks (trailing flanks) and the clearance flanks (leading flanks). For this reason, even when the threaded shank 12 of the male threaded member 1 is completely screwed in the threaded holes 32 of the female threaded member 3, the fastening between the threaded shank 12 and the threaded holes 32 can be sufficiently prevented from being loosened.

A reason why a large force is not necessary when fastening the male threaded member 1 to the female threaded member 3 is as follows.

Since the thread ridge 15 is a discontinuous ridge on which the plurality of dividing portions 14 are formed in the middle and the discontinuous portions are set as the locking portions 18, it is not necessary to elastically deform the entire thread ridge as in the threaded member of the related art having locking effects, and it is easy to elastically deform the locking portions 18. For this reason, a large force is not necessary when fastening the male threaded member 1 to the female threaded member 3, and it is easy to fasten the threaded members together.

In each of the first locking portions 18a, the leading flank 21b is disposed on the inside of the leading flank 22b of the basic ridge profile B. For this reason, a large gap is formed between the leading flank 21b and the leading flank 22b (the leading flank 41b of the thread ridge 35) of the basic ridge profile B. As a result, each of the first locking portions 18a is likely to elastically deform toward the gap between the leading flank 21b and the leading flank 41b of the thread ridge 35.

The width of each of the first locking portions 18a at the same height as that of the root 23 is smaller than the width of the basic ridge profile B. For this reason, the first locking portions 18a are more likely to elastically deform.

Each of the second locking portions 18b is configured such that the trailing flank 21a is disposed on the inside of the trailing flank 22a of the basic ridge profile B. For this reason, a large gap is formed between the trailing flank 21a and the trailing flank 22a (the trailing flank 41a of the thread ridge 35) of the basic ridge profile B. As a result, each of the second locking portions 18b is likely to elastically deform toward the gap between the trailing flank 21a and the trailing flank 41a of the thread ridge 35.

The width of each of the second locking portions 18b at the same height as that of the root 23 is smaller than the width of the basic ridge profile B. For this reason, the second locking portions 18b are more likely to elastically deform.

The inclined portions 19a are provided on both end portions of each of the first locking portions 18a in the helical direction and the inclined portions 19b are provided on both end portions of each of the second locking portions 18b in the helical direction. Therefore, when screwing the threaded shank 12 of the male threaded member 1 into the threaded holes 32 of the female threaded member 3 while the threaded shank 12 and the threaded holes 32 are relatively rotated, resistance between the locking portions 18 and the thread ridges 35 of the female threaded member 3 is small, and the threaded shank 12 and the threaded holes 32 can be smoothly rotated.

Since the thread ridge 15 has the continuous portions 15a and the long discontinuous portion 15b, the strength of the thread ridge 15 is maintained by the continuous portions 15a and the long discontinuous portion 15b. For this reason, even when a large force is applied in a direction of pulling the threaded shank 12 of the male threaded member 1 out from the threaded holes 32 of the female threaded member 3, the thread ridge 15 is unlikely to be damaged and the threaded shank 12 does not come out from the threaded holes 32.

Another Embodiment

The threaded member of the invention has a discontinuous helical thread ridge on which the plurality of dividing portions are formed in the middle. It is sufficient that at least one of the discontinuous portions of each of the thread ridges, which is interposed between the dividing portions, is a locking portion which is configured such that a flank angle of one flank, out of flanks on both sides of the thread ridge, is smaller than a flank angle of a flank corresponding to the basic ridge profile and at least a part of the flank is disposed on the outside of the flank corresponding to the basic ridge profile. The threaded member is not limited to the male threaded member 1 of the illustrated example.

For example, the threaded member of the invention may be a male threaded member, or may be a female threaded member. It is preferable that the threaded member be a male threaded member in consideration of easiness of forming a locking portion.

The threaded member of the invention may be made of plastic, or may be made of metal. It is preferable that the threaded member be made of plastic in consideration of easiness of forming a locking portion and easiness of elastic deformation of the locking portion.

There may be only any one of a first locking portion and a second locking portion as the locking portion. Even when there is only any one of the first locking portion and the second locking portion, a large frictional force is generated between the locking portion and thread ridges of another threaded member. Consequently, locking effects sufficiently arise. It is preferable that the number of the first locking portions in the threaded member be 1 to 8, and it is more preferable that the number of the first locking portions be 1 to 4. It is preferable that the number of the second locking portions in the threaded member be 1 to 8, and it is more preferable that the number of the second locking portions be 1 to 4.

The length of the first locking portion in a direction where thread ridges extend is approximately 5 to 20% of the circumference of the threaded shank of the thread ridges.

On the contrary, the length of the second locking portion in the direction where the thread ridges extends is approximately 5 to 30% of the circumference of the threaded shank of the thread ridges.

The inclined portions of the locking portion may not necessarily be provided.

The long discontinuous portion 15b of the thread ridge 15 may not necessarily be provided.

In the threaded member of the invention, a force generated at the time of fastening (frictional force) can be adjusted by the design of the locking portion. For example, by changing the flank angle of the flank of the locking portion, by changing the width of the locking portion at the same height as that of the root, or by changing the hardness of a material of the threaded member, a frictional force generated between the locking portion and the thread ridges of another threaded member can be set to a desired level.

<Fastening Member>

A fastening member of the invention includes the threaded member and the female threaded member detachably fastened to the male threaded member. Any one of or both of the male threaded member and the female threaded member is the threaded member of the invention. Although the fastening member is detachable, the fastening member does not necessarily have to be fastened in the invention, and each of the male threaded member and the female threaded member may be present in a state of not being fastened. It is preferable that the male threaded member be the threaded member of the invention and the female threaded member be a female threaded member on which the thread ridges are designed in accordance with the basic ridge profile, in consideration of easiness of forming the locking portion. The following forms can be given as examples.

<1> The fastening member including the female threaded member detachably fastened to the male threaded member that has the discontinuous helical thread ridge on which the plurality of dividing portion are formed in the middle that and has at least one of the discontinuous portions of each of the thread ridges, which is interposed between the dividing portions, as the locking portion, the locking portion being configured such that the flank angle of one flank, out of flanks on both sides of the thread ridge, is smaller than the flank angle of the flank of the thread ridge corresponding to the female thread and at least part of the one flank is disposed on the outside of the flank corresponding to the basic ridge profile.

<2> The fastening member according to <1> including the female threaded member detachably fastened to the male threaded member having at least one of the discontinuous portions as the locking portion of which the other flank is on the inside of the flank of the thread groove corresponding to the female thread such that a gap is formed on the whole between the other flank, out of the flanks on both sides, and the flank of the thread groove corresponding to the female thread.

<3> The fastening member according to <1> or <2> including the female threaded member detachably fastened to the male threaded member having at least one of the discontinuous portions as the first locking portion, the first locking portion being configured such that the flank angle of the trailing flank is smaller than the flank angle of the trailing flank of the thread ridge corresponding to the female thread, and at least a part of the trailing flank is disposed on the outside of the trailing flank of the thread groove corresponding to the female thread and having at least one of the discontinuous portions as the second locking portion, the second locking portion being configured such that the flank angle of the leading flank is smaller than the flank angle of the leading flank of the thread ridge corresponding to the female thread, and at least a part of the leading flank is disposed on the outside of the leading flank of the thread groove corresponding to the female thread.

<4> The inclined portions that form a ridge of which the height becomes lower as becoming closer to ends thereof are provided on both ends of the locking portion in the helical direction in the fastening member according to any one of <1> to <3>.

<5> A dart including a barrel, a point fastened to a first end portion of the barrel, a shaft fastened to a second end portion of the barrel, and a flight attached to the shaft, in which the point and the barrel or the shaft and the barrel are the fastening member according to any one of <1> to <4>.

Herein, the "thread ridge corresponding to the female thread" is the thread ridge of the female thread which comes into contact with any thread ridge of the male threaded member through a flank surface thereof in a state where the threaded shank of the male threaded member is completely screwed in the female threaded member. In FIG. 4 which illustrates a state in which the threaded shank 12 of the male threaded member 1 is completely screwed in the threaded holes 32 of the female threaded member 3, the thread ridges of the female threaded member 3 corresponding to the locking portions 18a that are the thread ridges of the male threaded member 1 are the thread ridges of the female threaded member 3 having the flank surfaces 41a which come into contact with the flank surfaces 21a or 21b of the locking portions 18a or the thread ridges of the female threaded member 3 having the flank surfaces 41b.

The "thread ridge corresponding to the female groove" is the thread groove in a space surrounded by the flank surfaces of the thread ridge of the female thread which comes into contact with any thread ridge of the male threaded member through a flank surface thereof in a state where the threaded shank of the male threaded member is completely screwed in the female threaded member. In FIG. 4 which illustrates the state in which the threaded shank 12 of the male threaded member 1 is completely screwed in the threaded holes 32 of the female threaded member 3, the thread groove of the female threaded member 3 corresponding to the locking portion 18a that is the thread ridge of the male threaded member 1 is the thread groove of the female threaded member 3 in a space surrounded by the flank surface 41a and the surface 41b of the thread ridge of the female threaded member 3, which come into contact with the flank surfaces 21a and 21b of the locking portion 18a.

In addition to a combination of a bolt and a nut, an object that can be easily assembled and disassembled into a plurality of members by a threaded portion, examples of the fastening member include sports or game equipment (such as a dart), a toy, daily necessities, assembled furniture, an electric product, and machinery.

Hereinafter, a case where the fastening member of the invention is a dart will be described as an example with reference to the drawings.

Dart

Figure 5:
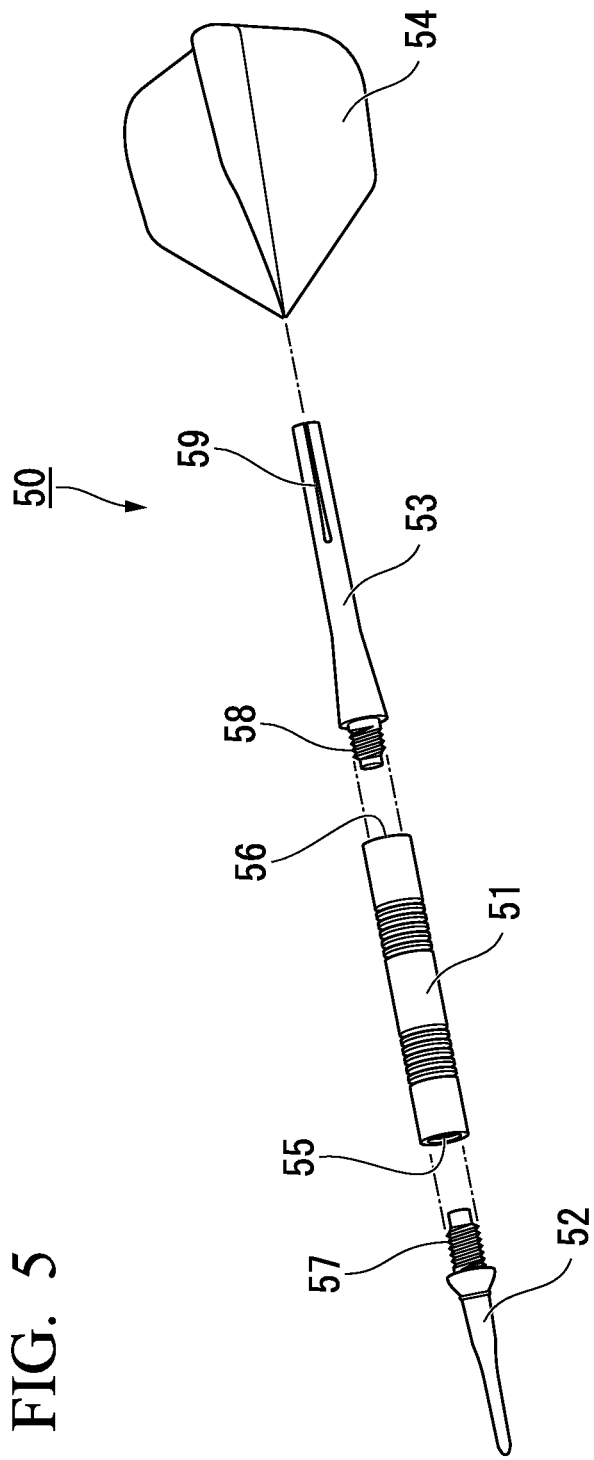
FIG. 5 is a perspective view illustrating a state where a soft dart is disassembled.

FIG. 5 is a perspective view illustrating a state where a soft dart is disassembled.

A dart 50 is configured with a metal barrel 51 which is a portion held by a player with fingers, a point 52 (tip) fastened to a first end portion of the barrel 51, a shaft 53 fastened to a second end portion of the barrel 51, and a flight 54 (arrow feathers) attached to a rear half portion of the shaft 53.

A first threaded hole 55 is provided in the first end portion of the barrel 51, and a second threaded hole 56 is provided in the second end portion.

A threaded shank 57 which is screwed into the first threaded hole 55 of the barrel 51 is provided on a rear end side of the point 52.

A threaded shank 58 which is screwed into the second threaded hole 56 of the barrel 51 is provided on a front end side of the shaft 53.

A slit 59 into which the flight 54 is inserted is provided in the rear half portion of the shaft 53.

In the dart of the invention, the threaded member of the invention is used as the point 52.

Figure 6:
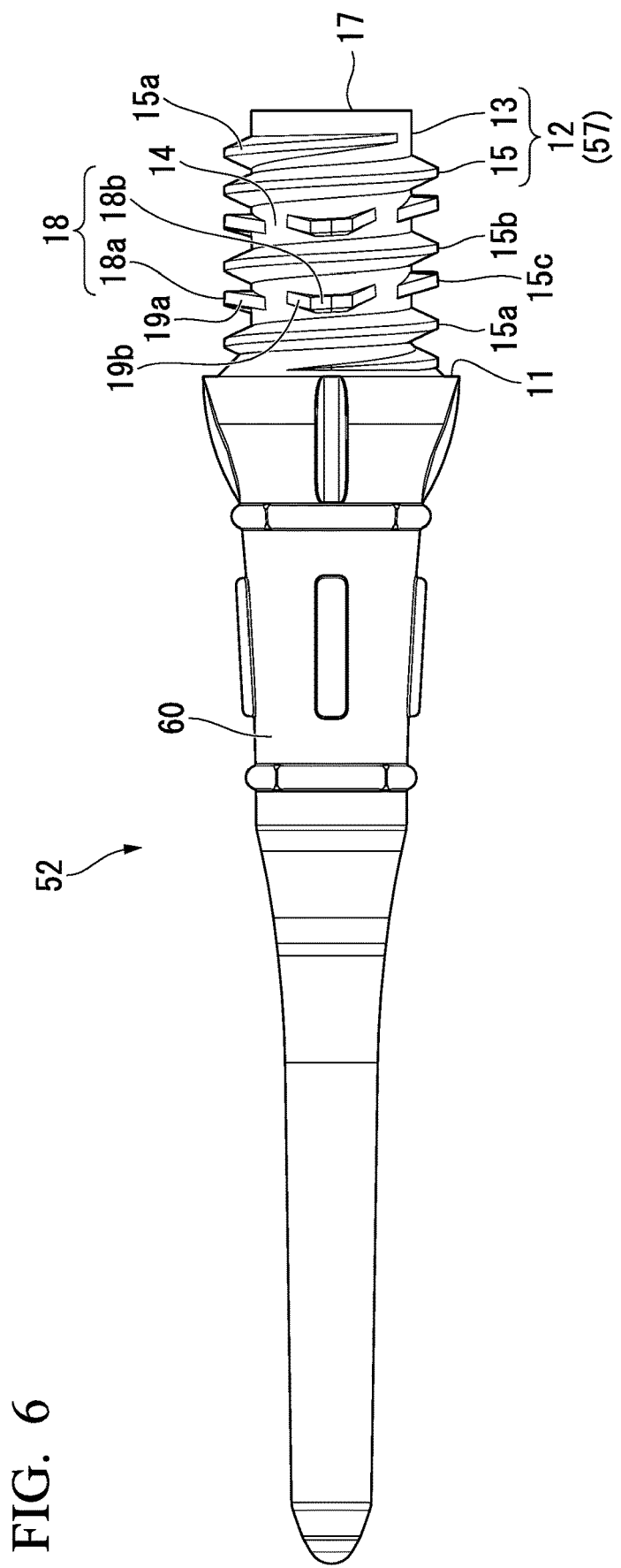
FIG. 6 is a side view illustrating an embodiment of a point of a dart of the invention.

FIG. 6 is a side view illustrating an embodiment of a point of the dart of the invention.

The point 52, which is the threaded member of the invention, has a conical point main body 60 and the threaded shank 12 (the threaded shank 57) jutted out from a bottom surface of a cone, which is the point main body 60.

Hereinafter, the point 52 will be described with the same configurations as those of FIGS. 1 and 2 assigned with the same reference signs.

Mechanism of Action

Since the fastening member (dart) of the invention described above has locking effects and includes the threaded member (point) that does not require a large force when being fastened to another threaded member, fastening by the threaded portion is unlikely to be loosened, and a large force is not necessary when fastening the members together.

Another Embodiment

The fastening member of the invention may include the male threaded member and the female threaded member detachably fastened to the male threaded member. Any one of or both of the male threaded member and the female threaded member may be the threaded member of the invention.

In the dart of the invention, it is sufficient that at least one of the point, the barrel, and the shaft is the threaded member of the invention, and the dart is not limited to the dart 50 in the illustrated example.

EXAMPLE

Hereinafter, the invention will be described in detail with an example, but the invention is not limited thereto.

A mold corresponding to the point 52 illustrated in FIG. 6 was made, and plastic was formed by using the mold. Consequently, the plurality of points 52 were manufactured.

Barrels made by manufacturers from various countries, that is, 1) a barrel made by Unicorn, 2) a barrel made by Halows, 3) a barrel made by Target, 4) a barrel made by Winmau, 5) a barrel made by Dynasty, 6) a barrel made by Monster, 7) a barrel made by Greenroom, 8) a barrel made by DMC, 9) a barrel made by Trinidad, and 10) a barrel made by Puma were prepared.

The point 52 was screwed into each barrel and was fastened. After a dart was made by attaching a flight to a shaft, the throwing of the dart was repeated. Even in a case where any one of the barrels of ten companies was used, fastening between the point 52 and the barrel did not become loosened.

INDUSTRIAL APPLICABILITY

The threaded member of the invention is useful as a bolt and a nut, or as a threaded member used in sports or game equipment (such as a dart), a toy, daily necessities, assembled furniture, an electric product, and machinery.

REFERENCE SIGNS LIST 1 male threaded member
3 female threaded member
10 member main body
11 bearing surface
12 threaded shank
13 cylinder
14 dividing portion
15 thread ridge
15a continuous portion
15b long discontinuous portion
15c short discontinuous portion
17 thread end
18 locking portion
18a first locking portion
18b second locking portion
19a inclined portion
19b inclined portion
21a trailing flank
21b leading flank
22a trailing flank
22b leading flank
23 root
32 threaded hole
35 thread ridge
41a trailing flank
41b leading flank
50 dart
51 barrel
52 point
53 shaft
54 flight
55 first threaded hole
56 second threaded hole
57 threaded shank
58 threaded shank
59 slit
60 point main body
B basic ridge profile
α1 flank angle
α2 flank angle
β1 flank angle
β2 flank angle

The invention claimed is:

1. A threaded member formed from a first end side to a second end side along the center line and being configured to be screwed with a member having a basic ridge profile in which a basic flank on each side of a ridge has a same flank angle, the threaded member comprising:
a discontinuous thread ridge formed along a helical direction around the center line of the threaded member, having a first flank on one side of the discontinuous thread ridge and a second flank on an opposite side of the discontinuous thread ridge, including a plurality of dividing portions and discontinuous portions, the plurality of dividing portions being formed in a middle of the helical direction of the discontinuous thread ridge and dividing the discontinuous thread ridge, the discontinuous portions are interposed parts in the dividing portions, wherein at least one of the discontinuous portions is a locking portion wherein the locking portion has a first flank of the pair of flanks that has a first flank angle smaller than the flank angle of the basic flank and at least part of the first flank in the helical direction is offset to the first end side from a corresponding angle of the basic flank as viewed in a superimposed view of a cross-section of the thread ridge and a cross section of the basic ridge profile, each cross-section being taken along a plane including a center axis of the thread profile, a second flank of the pair of flanks is offset to the first end side of the basic flank corresponding to the basic ridge profile so as to form a gap entirely separating with respect to the basic flank of the member having the basic ridge profile as viewed in the superimposed view, and wherein the first flank is a leading flank or a trailing flank, the second flank is a trailing flank when the first flank is a leading flank and the second flank is a leading flank when the first flank is a trailing flank, wherein the leading flank refers to a flank facing a moving direction of the threaded member when being screwed in, and the trailing flank refers to a flank on a side opposite to the leading flank.

2. The threaded member according to claim 1,
wherein at least one of the discontinuous portions is a first locking portion which is configured such that a flank angle of a trailing flank is smaller than the basic flank angle of a trailing flank of the member having the basic ridge profile and at least part of the trailing flank in the helical direction is offset to the moving direction from a corresponding angle of the basic flank of the trailing flank of the member having the basic ridge profile in the first end side as viewed in the superimposed view, and
at least one of the discontinuous portions is a second locking portion which is configured such that a flank angle of a leading flank is smaller than the basic flank angle of a leading flank member having of the basic ridge profile and at least a part of the leading flank in the helical direction is offset in the moving direction from a corresponding angle of the basic flank of the leading flank of the basic ridge profile in the first end side as viewed in the superimposed view.

3. The threaded member according to claim 1,
wherein inclined portions that form a ridge of which a height becomes lower as becoming closer to the dividing portions are provided on both ends of the locking portion in the helical direction.

4. A fastening member comprising:
a male threaded member; and
a female threaded member that is detachably fastened to the male threaded member,
wherein one or both of the male threaded member and the female threaded member is the threaded member according to claim 1.

5. A dart comprising:
a barrel;
a point fastened to a first end portion of the barrel;
a shaft fastened to a second end portion of the barrel; and
a flight attached to the shaft,
wherein at least one of the point, the barrel, and the shaft is the threaded member according to claim 1.

* * * * *